US008656650B2

(12) United States Patent
Gray et al.

(10) Patent No.: US 8,656,650 B2
(45) Date of Patent: *Feb. 25, 2014

(54) TAKE-UP FASTENER FOR RESISTING UPLIFT LOADS IN LIGHT FRAMED CONSTRUCTION

(71) Applicant: Simpson Strong-Tie Company Inc., Pleasanton, CA (US)

(72) Inventors: Daniel M. Gray, McKinney, TX (US); Samuel T. Hensen, Prosper, TX (US); Bryan Ables, New Braunfels, TX (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,712

(22) Filed: Oct. 1, 2012

(65) Prior Publication Data

US 2013/0039699 A1  Feb. 14, 2013

Related U.S. Application Data

(63) Continuation of application No. 12/409,255, filed on Mar. 23, 2009, now Pat. No. 8,276,323.

(51) Int. Cl.
*E04B 7/04* (2006.01)
(52) U.S. Cl.
USPC .......................... 52/92.1; 52/293.3; 411/525
(58) Field of Classification Search
USPC ............... 52/92.1, 92.2, 293.3, 167.1, 236.3, 52/745.21, 573.1, 223.13; 411/536, 520, 411/525, 526
See application file for complete search history.

(56) References Cited

U.S. PATENT DOCUMENTS 4,157,725 A * 6/1979 Stanaitis ..................... 411/147
4,781,503 A 11/1988 Bogel
(Continued)

FOREIGN PATENT DOCUMENTS

EP 1700967 9/2006
GB 1312912 4/1973

OTHER PUBLICATIONS

U.S. Appl. No. 13/632,583, filed Oct. 1, 2012.
(Continued)

*Primary Examiner* — William Gilbert
*Assistant Examiner* — James Ference
(74) *Attorney, Agent, or Firm* — Vierra Magen Marcus LLP (57) ABSTRACT

A take-up fastener is disclosed for fastening a level in a frame construction to the level below so as to resist upward forces generated by wind and other sources on the framed construction. The take-up fastener in general includes a take-up plate, or washer, fastened to a portion of the upper level and a take-up screw fit through the take-up plate and fastened to the adjacent level below. Once the take-up fastener is fully assembled, the take-up plate includes a pair of tabs which are capable of engaging threads on a take-up screw in a way that allows one-way motion of the take-up screw relative to the take-up plate. In particular, the take-up plate can move downward relative to the take-up screw, for example on constricting of the wooden members to which the take-up plate is affixed. However, the engagement between the take-up plate and take-up screw prevents movement of the take-up plate upward with respect to the take-up screw, for example upon an upward load due to wind or other external force.

11 Claims, 9 Drawing Sheets

(56) References Cited

U.S. PATENT DOCUMENTS

| | | | |
|---|---|---|---|
| 4,911,594 A | | 3/1990 | Fisher |
| 5,060,436 A | * | 10/1991 | Delgado, Jr. .................... 52/295 |
| 5,364,214 A | | 11/1994 | Fazekas |
| 5,707,193 A | * | 1/1998 | Hasegawa ..................... 411/433 |
| 5,775,862 A | | 7/1998 | Cullen |
| 5,833,422 A | * | 11/1998 | Haga et al. .................... 411/526 |
| 5,897,281 A | * | 4/1999 | Haga et al. .................... 411/525 |
| 6,183,182 B1 | | 2/2001 | Baumgartner |
| 6,195,949 B1 | | 3/2001 | Schuyler |
| 6,367,205 B2 | * | 4/2002 | Cornett, Sr. ....................... 52/23 |
| 6,560,940 B2 | * | 5/2003 | Mueller .......................... 52/295 |
| 6,565,303 B1 | | 5/2003 | Riccitelli et al. |
| 7,178,298 B1 | | 2/2007 | Ebeling, Sr. |
| 7,637,072 B2 | | 12/2009 | Parish |
| 7,645,107 B2 | | 1/2010 | Yoneoka |
| 7,950,886 B2 | | 5/2011 | Siegal |
| 2002/0194803 A1 | * | 12/2002 | Mitchell ......................... 52/297 |
| 2004/0016046 A1 | | 1/2004 | Siegal |
| 2005/0008456 A1 | | 1/2005 | Birkelbach et al. |
| 2005/0095085 A1 | * | 5/2005 | Winker ......................... 411/533 |

OTHER PUBLICATIONS

International Search Report and Written Opinion of the International Searching Authority dated Jul. 23, 2010 in International Application No. PCT/US2010/028148.

Office Action dated Sep. 7, 2011 in U.S. Appl. No. 12/409,255.

Response to Office Action dated Oct. 5, 2011 in U.S. Appl. No. 12/409,255.

Office Action dated Nov. 7, 2011 in U.S. Appl. No. 12/409,255.

Strongtie, "High Wind-Resistant Construction," Jan. 31, 2007, Strongtie, C-HW05-R, pp. 37, 17 and 19.

Response to Office Action dated Feb. 7, 2012 in U.S. Appl. No. 12/409,255.

Notice of Allowance and Fee(s) Due dated Jun. 5, 2012 in U.S. Appl. No. 12/409,255.

Office Action dated Jan. 3, 2013 in U.S. Appl. No. 13/632,583.

Response to Office Action filed Feb. 4, 2013 in U.S. Appl. No. 13/632,583.

* cited by examiner

TAKE-UP FASTENER FOR RESISTING UPLIFT LOADS IN LIGHT FRAMED CONSTRUCTION

CLAIM OF PRIORITY

This application is a continuation application of U.S. patent application Ser. No. 12/409,255, entitled "TAKE-UP FASTENER FOR RESISTING UPLIFT LOADS IN LIGHT FRAMED CONSTRUCTION," filed Mar. 23, 2009, which application is incorporated herein by reference in its entirety.

BACKGROUND OF THE INVENTION

1. Field of the Invention

The present invention relates to a fastener for opposing uplift forces in light framed construction.

2. Description of the Related Art

Figure 1:
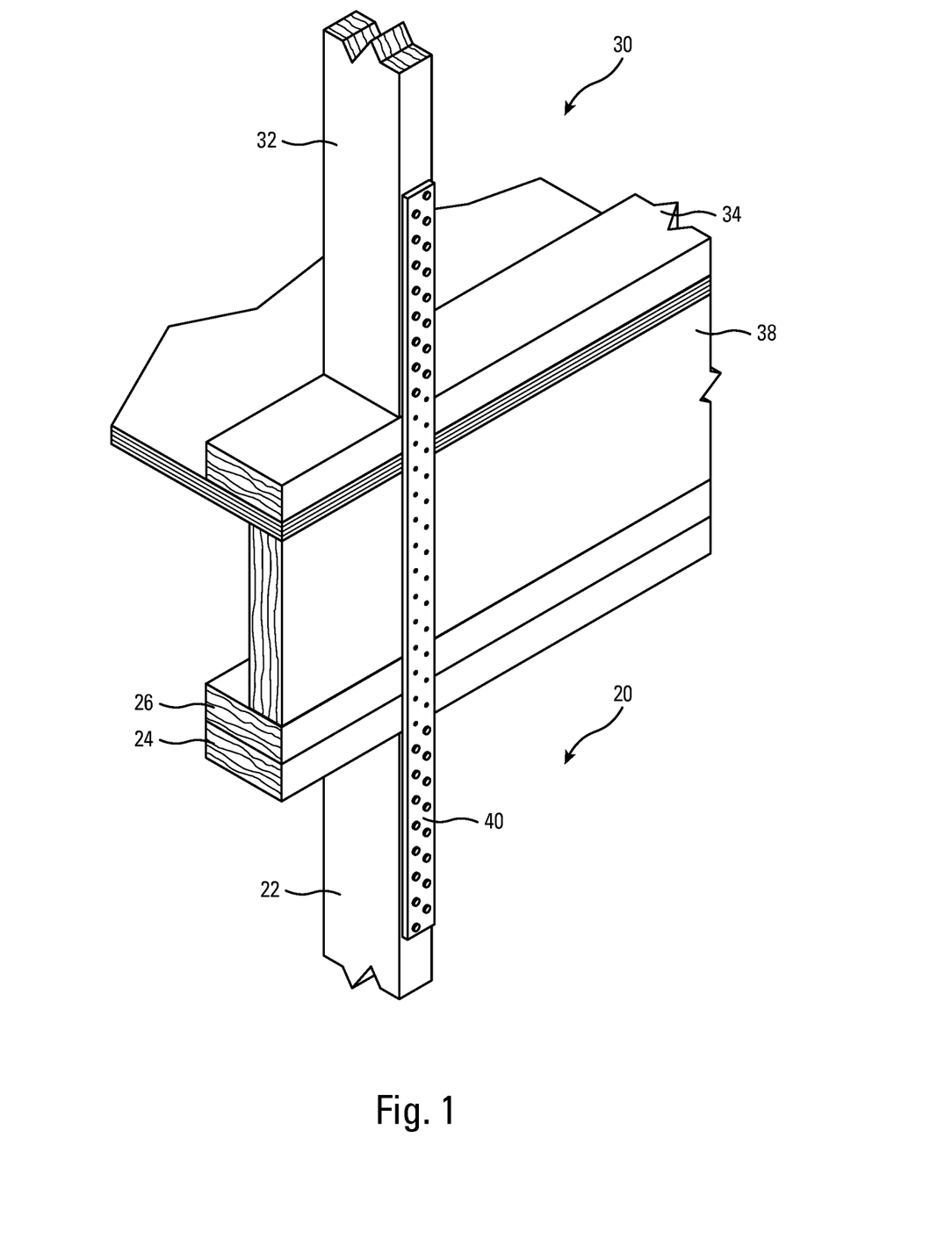
FIG. 1 is a perspective view of adjacent levels in a frame construction affixed together using a conventional coil strap.

In construction such as residences, small buildings, multi-family and other light-framed construction, an uplift restraint system typically includes uplift resisting connectors at the roof to top of a wall, top of a wall to vertical studs, vertical studs between adjacent floors and to the foundation. Winds and other external forces may generate upward loads on framing members. In order to counteract these upward loads, the framing members may be anchored to the surface on which they are supported. On the ground level, anchor rods are typically sunk into a concrete foundation, and the bottom plate of the wall is bolted to the anchor rods. For levels built on top of the first level, straps are often used to anchor the upper level to the level below. FIG. 1 is a perspective view of an upper level 30 anchored to a lower level 20 via a coil strap 40 in a light framed construction. While only one anchor strap is shown affixed to a pair of aligned studs 22 and 32 on the adjoining levels, coil straps may be provided in each pair of aligned studs in the respective levels to anchor the level 30 to the level 20.

Prior art FIG. 1 shows a stud 22 and top plates 24 and 26 from lower level 20. A stud 32, bottom plate 34, subflooring 36 and floor joist 38 are shown from upper level 30. Nails or other fasteners may be provided along the length of coil strap 40 (at least in the portions overlapping the lower stud 22 and upper stud 32) to fasten the coil strap 40 to the upper and lower levels. A typical coil strap 40 may be formed of various thicknesses including 16 gauge steel, such as for example the CS16 coil strap by Simpson Strong-Tie Company, Inc. of Pleasanton, Calif.

While effective at anchoring upper levels to lower levels, coil straps have certain drawbacks. First, they need to be positioned on the exterior of a framed construction, and require scaffolding or other support mechanisms to allow workers to install the coil straps. Second, the vertical studs must align on adjacent floors for strapping to be installed. Third, the wooden members in a framed construction, including the top and bottom plates, floor and rim joists, settle or compress during to the load of the structure and shrink over time. Shrinkage in lumber occurs as the moisture in the wood members evaporates causing the members to constrict. This constriction may result in buckling or bowing outward of the strap, as well as any siding or exterior covering of the framed construction.

SUMMARY OF THE INVENTION

The present invention, roughly described, relates to a take-up fastener for fastening a level in a frame construction to the level below so as to resist upward forces generated by wind and other sources on the framed construction. The take-up fastener in general includes a take-up plate, or washer, fastened to a portion of the upper level and a take-up screw fit through the take-up plate and fastened to the adjacent level below. Once the take-up fastener is fully assembled, the take-up plate includes a pair of tabs which are capable of engaging threads on a take-up screw in a way that allows one-way motion of the take-up screw relative to the take-up plate. In particular, the take-up plate can move downward relative to the take-up screw, for example on constricting of the wooden members to which the take-up plate is affixed. However, the engagement between the take-up plate and take-up screw prevents movement of the take-up plate upward with respect to the take-up screw, for example upon an upward load due to wind or other external force.

The take-up plate includes a pair of tabs facing each other and angled upward off of the flat planar surface of the take-up plate. A hole is tapped in between the tabs so that the tabs have semicircular edges which are threaded to a diameter and pitch to match corresponding threads on the take-up screw. Once the hole is tapped into the tabs of the take-up plate, the tabs are bent further upward to an assembly angle so that the take-up screw may be assembled through the opening between the tabs without binding against the tabs.

The take-up screw in general includes a head portion separated from a shank portion by a circular flange. Threads for engaging the tabs, referred to herein as tab engagement threads, are provided adjacent to the flange but slightly spaced therefrom by a clearance space. The opposite end of the shank includes cutting threads for driving into and securely fastening within a lower level.

On assembly, the take-up screw may be inserted through the opening between the pair of tabs and driven into and through portions of the upper level, such as for example through a bottom plate and subflooring. The distal end of the screw is then further inserted and driven into portions of the lower level, such as for example the top plates. When the take-up screw is nearly fully inserted, the tabs engage the flange beneath the head of the take-up screw. Further insertion of the screw then causes the flange to permanently deform the tabs downward, to thereby decrease the diameter of the hole defined between the tabs.

This is the finished assembly position. Thereafter, owing to constriction of wooden members, the take-up plate may slide down along the shank of the take-up screw. As the tabs are deformed, if the plate has moved far enough down relative to the screw, the tabs engage with the tab engagement threads on the screw. Thereafter, continued downward movement of the plate relative to the screw is permitted, for example upon further constriction of the wooden members. However, once the tabs engage with the tab engagement threads on the screw, the tabs prevent upward movement of the plate relative to the screw, for example under an upward load exerted on the upper level by wind or other external forces. As the upward force of the take-up plate and tabs increases against the take-up screw, the tabs bind more tightly against the tab engagement threads of the take-up screw.

DETAILED DESCRIPTION

The present invention will now be described with reference to FIGS. 2-21, which in embodiments relate to a take-up fastener for receiving upward loads in levels of a framed construction. It is understood that the present invention may be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 2:
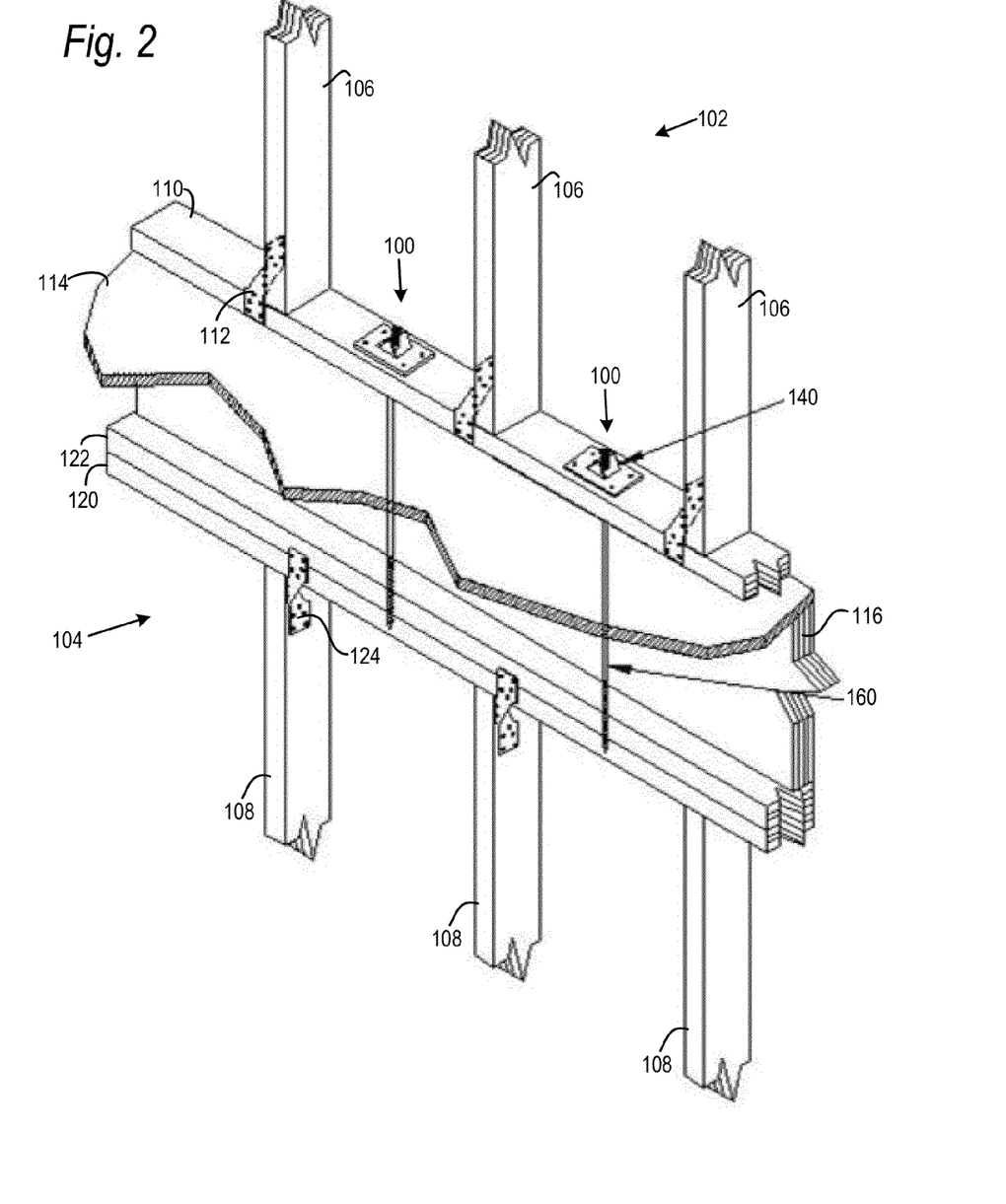
FIG. 2 is a perspective view of adjacent levels affixed together using take-up fasteners according to an embodiment of the present invention.

FIG. 2 is a partial perspective view of adjacent levels 102 and 104 of a framed construction. Level 102 is fastened to level 104 by take-up fasteners 100 which effectively transfer upward loads from level 102 to level 104, while allowing for settling of wooden members in the framing of the respective levels as explained in greater detail hereinafter. FIG. 2 shows a portion of the first and second levels including three studs 106 in level 102 and three studs 108 in level 104. There will be many more studs 106 and 108 in the respective layers. In addition to studs 106, the elements in level 102 shown in the partial view of FIG. 2 also include bottom plate 110, connectors 112 for connecting studs 106 to bottom plate 110, sub-flooring 114, and a floor joist 116. In addition to studs 108, the elements in level 104 shown in the partial view of FIG. 2 also include top plates 120 and 122, and connectors 124 for connecting studs 108 to top plates 120 and 122.

A take-up fastener 100 according to the present invention may be provided between each pair of adjacent studs 106, 108. However, it is understood that the take-up fastener 100 may be provided between less than all adjacent pairs of studs, and more than one take-up fastener may be provided between an adjacent pair of studs, in further embodiments of the present system. Moreover, it is understood that the take-up fastener may be used with framing members other than studs in further embodiments, such as for example a Strong-Wall shearwall of Simpson Strong-Tie Company, Inc., Pleasanton, Calif.

As seen in FIG. 1, take-up fastener 100 includes a take-up plate, or washer, 140 affixed to base plate 110 of level 102, and a take-up screw 160. Take-up screw 160 has a first end affixed to plate 140 and a second end extending down into and fastened within top plates 122 and 120 of level 104. Each of these elements is explained in greater detail below.

Figure 3:
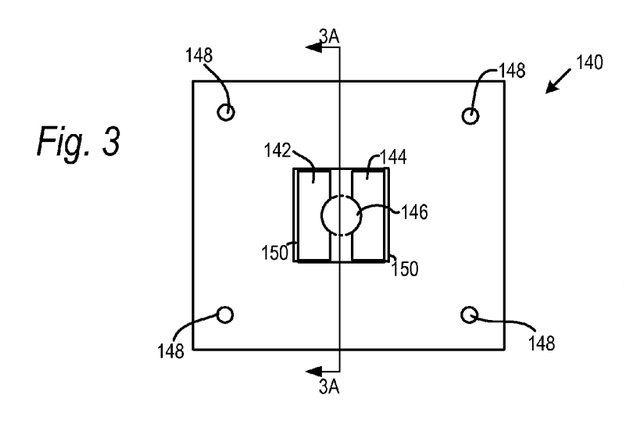
FIG. 3 is a top view of a take-up plate according to an embodiment of the present invention and FIG. 3A is a cross sectional view through line 3A-3A in FIG. 3.

Take-up plate 140 will now be described in greater detail with respect to FIGS. 3-6. FIG. 3 shows a top view of a finished take-up plate 140. Take-up plate 140 includes a pair of tabs 142 and 144 which angle upward out of a plane of the otherwise flat take-up plate 140. The tabs 142 and 144 are tapped with a threaded bit, so that the tabs 142, 144 each include semi-circular notched edges. The semi-circular notched edges define part of a circular hole 148 matching the diameter of threads on the take-up screw 160 as explained hereinafter. The notched edges are tapped with threads having a pitch matching the thread pitch of the threads on the take-up screw as explained hereinafter.

Take-up plate 140 is formed with a pair of grooves 150 at the base where the tabs 142, 144 bend upward from take-up plate 140. The grooves 150 allow the tabs 142, 144 to deform elastically a small amount as explained hereinafter. Grooves 150 may be cut or stamped into the surface of take-up plate 140 to a depth of 0.0075 inches deep, though this depth may be greater or lesser in alternative embodiments. Take-up plate 140 may be formed of 10 gauge steel with a length of 3½ inches and a width of 3 inches. It is understood that the gauge, length and width of take-up plate 140 may vary in alternative embodiments. Moreover, it is understood that plate 140 may be shapes other than rectangular or square in further embodiments. In one embodiment, the corners of plate 140 may be omitted or removed so that the plate is generally circular, oblong or oval. In such embodiments, the plate could be sized so that it fits within the width of the bottom plate 110 regardless of its orientation when fastened to the plate.

Take-up plate 140 further includes fastening holes 148 near the outer periphery of plate 140. The fastening holes are provided to receive nails, screws, bolts or other fasteners for fastening the take-up plate 140 to the bottom plate 110. While the plate 140 is affixed to bottom plate 110 in embodiments, the bottom plate 110 may be affixed to other portions of level 102 in further embodiments.

Figure 4:
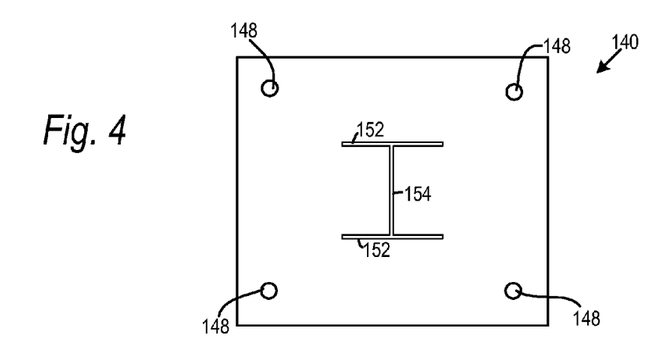
FIG. 4 is a top view of the take-up plate of FIG. 3 during a first stage of fabrication.

Formation of take-up plate 140 will now be explained with reference to FIGS. 4-6. Plate 140 may be formed in a die which allows fastening holes 148 to be cut along with longitudinal slits 152 and a transverse slit 154 centered and extending between slits 152. The longitudinal and transverse slits 152, 154 define tabs 142, 144. Longitudinal slits 152 may be centered along the length of plate 140 and may have a length of approximately 1.12 inches so that each tab has a length of 0.56 inches. The longitudinal slits 152 may be spaced from each other the distance equal to the length of transverse slit 154 which may for example be 1 inch. It is understood that each of the above-described dimensions may vary up or down in further embodiments of the present invention.

Figure 3A:
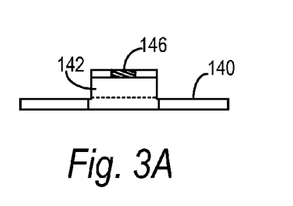
Figure 5:
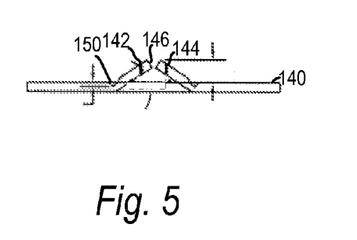
FIG. 5 is a top view of the take-up plate of FIG. 3 during a second stage of fabrication.
Figure 6:
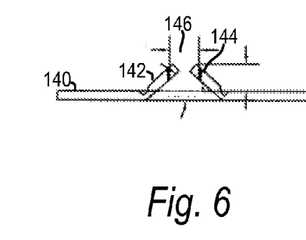
FIG. 6 is a top view of the take-up plate of FIG. 3 during a third stage of fabrication.

Referring now to the end views of FIGS. 5 and 6, grooves 150 may be formed in the plate 140 at the base of the tabs 142, 144. The tabs may be bent upward to an angle, referred to herein as an engagement angle, which in embodiments may be 33.75°. The engagement angle may be greater or lesser than this in alternative embodiments. Bent at the engagement angle, the tabs 142, 144 may extend a distance of 0.3125 inches above the surface of take-up plate 140. Once bent to the engagement angle, the tabs are tapped to define the hole 146 seen for example in FIG. 3. The tabs may be tapped for example with a ⅜ inch bit having 24 threads per inch. As mentioned above and explained hereinafter, this diameter and thread pitch matches the diameter and thread pitch of tab engagement threads formed on take-up screw 160. FIG. 3A is a cross-sectional view through FIG. 3 showing threaded hole 146 on tab 142. Tab 144 may have similar threads.

After hole 146 is tapped between tabs 142 and 144, the tabs 142 and 144 are bent further upward to a larger angle, referred to herein as the assembly angle, which may for example be 42°. At such an angle, hole 146 has a diameter of approximately 0.4 inches. It is understood that the assembly angle may be greater or lesser than 42° with the limitation that the diameter of hole 146 when tabs are bent in the assembly angle is greater than the outer diameter of all threads along the shank of take-up screw 160.

Figure 7:
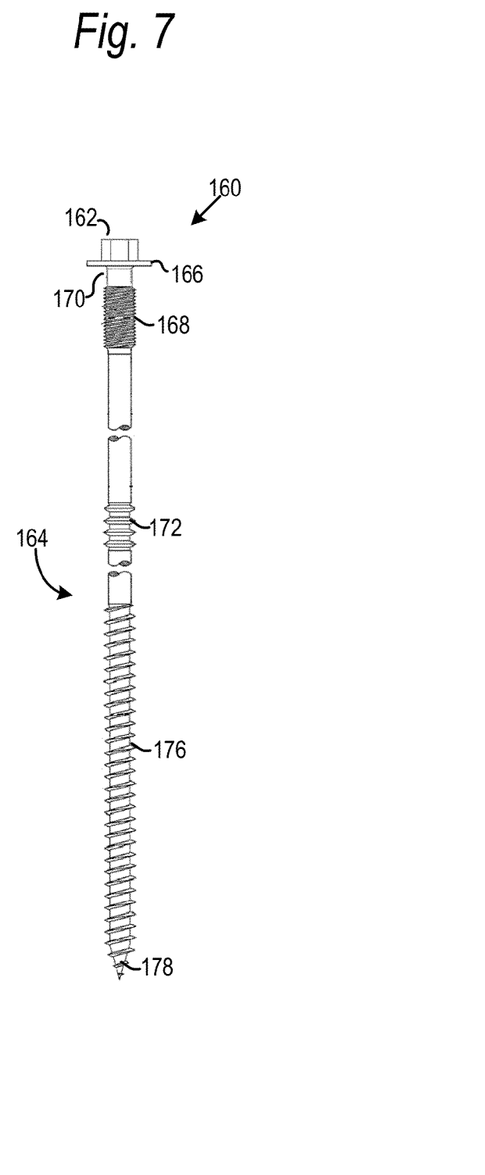
FIG. 7 is a top view of a take-up screw according to an embodiment of the present invention.

The take-up screw 160 will now be explained with reference to FIG. 7. Screw 160 is an elongate cylindrical member including a head 162 and a shank 164. Head 162 may for example be a hex head, though other known configurations for head 162 may be used in alternative embodiments. Head 162 is separated from shank 164 by an annular flange 166 having a greater diameter than shank 164. In embodiments, the flange 166 may have a diameter of 0.8 inches, though it may be larger or smaller than that in further embodiments.

Shank 164 includes three sets of threads or annular rings along its length. A first set of threads are the tab engagement threads 168 which interact with tabs 142 and 144 in the fully assembled take-up fastener to allow one-way motion of take-up screw 160 relative to take-up plate 140 as explained below. Tab engagement threads 168 may have an outer diameter of ⅜ inches and a thread pitch of 24 threads per inch. Tab engagement threads 168 may extend approximately one inch along the shank 164, though this distance may be lesser or greater in further embodiments. A clearance space 170 may be provided between tab engagement threads 168 and flange 166. As explained hereinafter, the clearance space 170 allows the tabs 142 and 144 to deform downward without binding against the shank 164.

Shank 164 may further include annular rings 172 provided approximately five inches down from flange 166, though they may be closer or farther from the flange 166 in further embodiments. As explained hereinafter, annular rings 172 have a diameter at least as large as tab engagement threads 168 so that the annular rings bore a hole through bottom plate 110 and subflooring 114 having a large enough diameter so that the tab engagement threads do not bind within bottom plate 110 or subflooring 114.

Cutting threads 176 are provided at the distal end of shank 164. Cutting threads 176 may have a ⅜ inch diameter and may have a length of 4.5 inches. It is understood that the diameter and length of cutting threads 176 may vary in alternative embodiments. Threads 176 may be of the type found on the Strong-Drive® screw from Simpson Strong-Tie Company, Inc., Pleasanton, Calif. As shown in FIG. 2 and as explained in greater detail hereinafter with respect to FIG. 10, cutting threads 176 are driven into and held fast within top plates 120 and 122 of level 104 to fasten the take-up fastener 100 to level 104. The distal end of take-up screw 160 may include a cutting tip so that take-up screw 160 may be driven through bottom plate 110, subflooring 114, and top plates 120 and 122 without having to initially create a bore hole through those members. An initial bore hole may be drilled in alternative embodiments.

Figure 8:
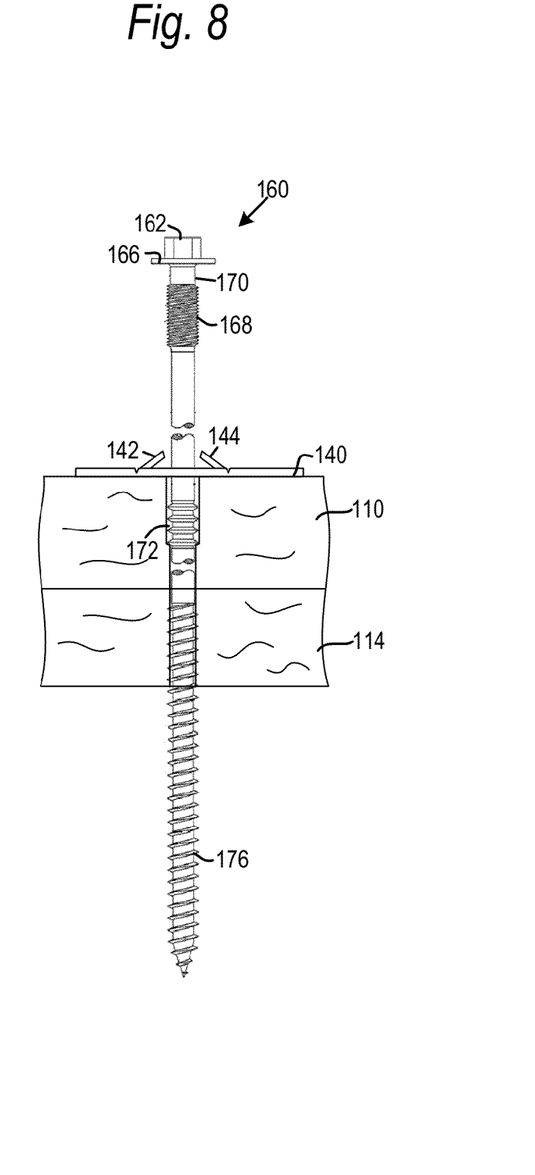
FIG. 8 is a side view of a take-up plate and take-up screw during a first stage of assembly of the take-up fastener according to an embodiment of the present invention.
Figure 9:
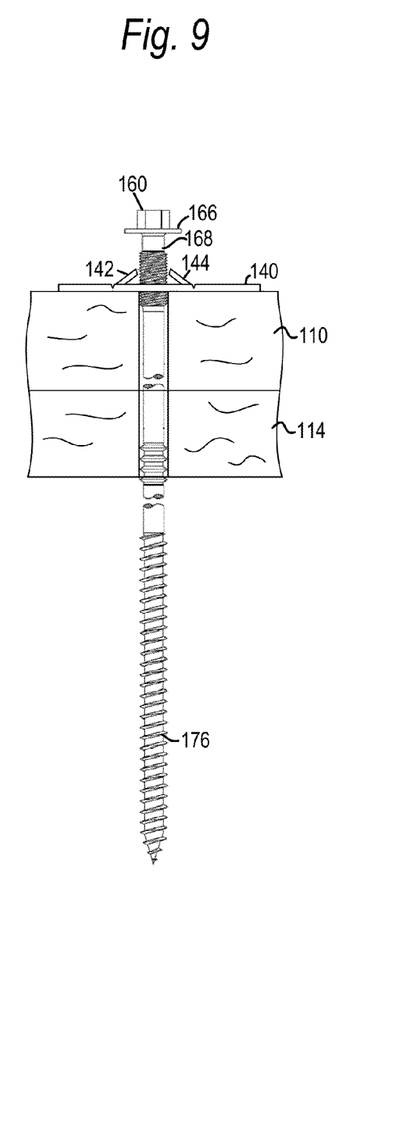
FIG. 9 is a side view of a take-up plate and take-up screw during a second stage of assembly of the take-up fastener according to an embodiment of the present invention.

The assembly of take-up fastener 100 will now be explained with reference to FIGS. 8-12. FIG. 8 shows take-up screw being driven through bottom plate 110 and subflooring 114 (partially shown in FIGS. 8-12). Tabs 142 and 144 of take-up plate 140 are bent to the assembly angle as explained above so that all portions of take-up screw 160 may pass through hole 146 defined by tabs 142 and 144. Thus, all portions of shank 164 including cutting threads 176, annular rings 172 and tab engagement threads 168 may pass through the hole 146 between tabs 142 and 144 without any portions of the shank 164 contacting either of tabs 142 and 144.

In the position shown in FIG. 8, cutting threads 176 have cut a bore hole through bottom plate 110 and subflooring 114. The diameter of this hole is increased by annular rings 172, which are shown just passing into bottom plate 110 in FIG. 8. In particular, instead of augering into the members 110 and 114, the annular rings enlarge the bore hole to a diameter at least equal to the outer diameter of the tab engagement threads 168. Thus, the tab engagement threads 168 may be drawn into the bore hole without binding, as shown for example in FIG. 9. As an alternative to annular rings, reverse cutting threads may be provided that have a reverse orientation to the cutting threads 176.

Figure 10:
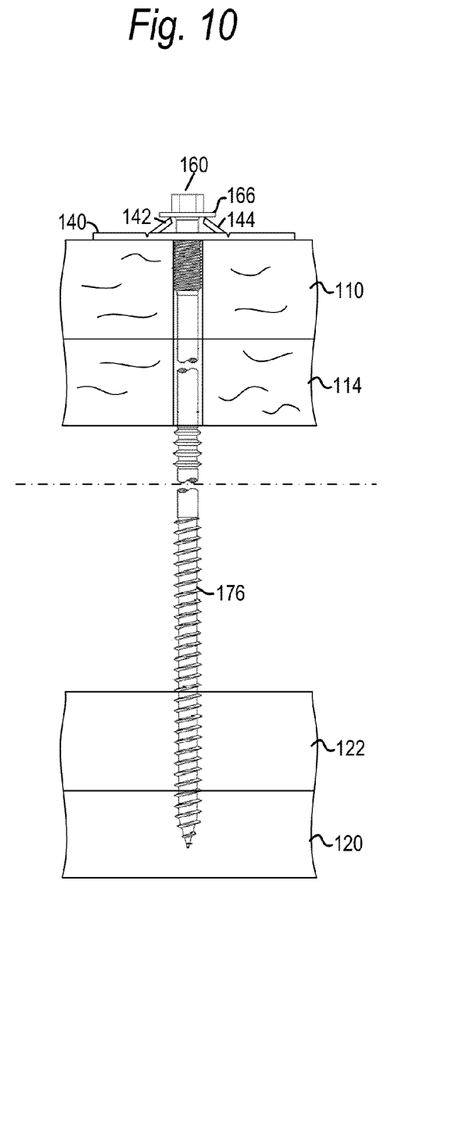
FIG. 10 is a side view of a take-up plate and take-up screw during a third stage of assembly of the take-up fastener according to an embodiment of the present invention.
Figure 11:
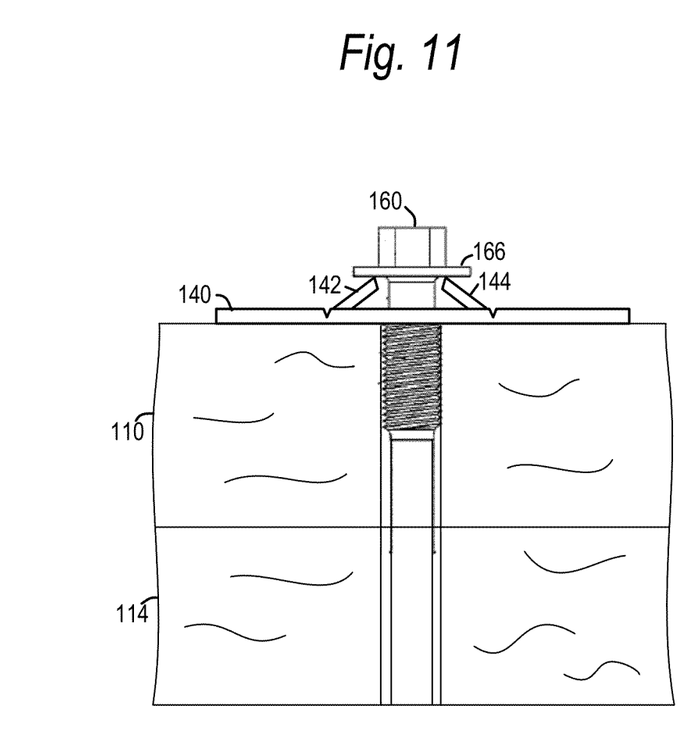
FIG. 11 is an enlarged partial view of the take-up plate and take-up screw shown in FIG. 10.
Figure 12:
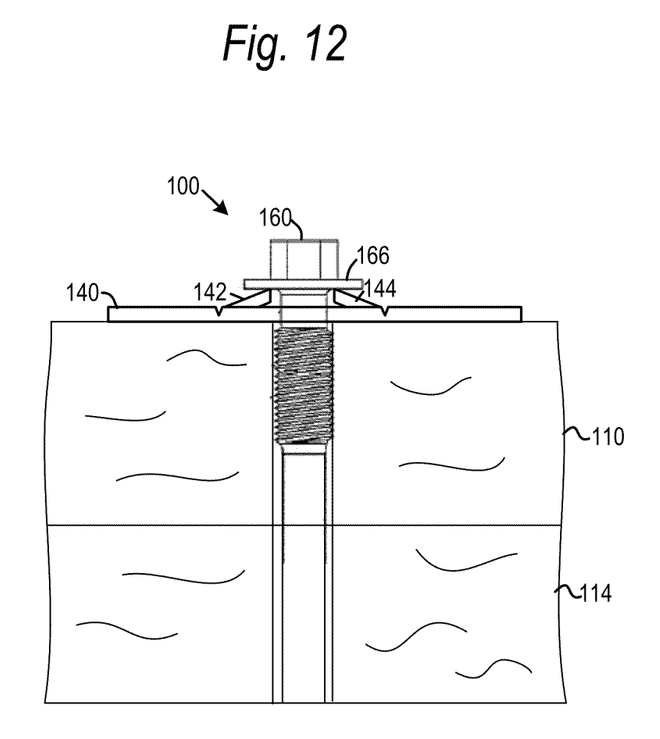
FIG. 12 is an enlarged partial view of the take-up plate and take-up screw in a fully assembled position.

In FIG. 10, take-up screw 160 has been driven through bottom plate 110 and subflooring 114 to the point where tabs 142 and 144 of plate 140 first contact flange 166. In this position, cutting threads 176 are embedded within top plates 122 and/or 120. FIG. 11 is an enlarged partial view showing the fastener 100 shown in FIG. 10, with the tabs 142 and 144 abutting against flange 166 of take-up screw 160. FIG. 12 is an enlarged view similar to FIG. 11, with the take-up screw 160 having been driven further into members 110 and 114. As the take-up screw is driven from the position in FIG. 13 to the position in FIG. 14, the flange 166 bears against tabs 142 and 144 and permanently deforms the tabs 142 and 144 downward toward each other so that the diameter of hole 146 between the tabs decreases. As indicated above, clearance space 170 is provided adjacent to flange 166 to prevent binding of the tabs 142, 144 against the take-up screw 160 as the tabs are deformed and the diameter of hole 146 grows smaller.

FIG. 12 shows the finished assembly of take-up fastener 100. Flange 166 has deformed tabs 142 and 144 downward toward each other so that tabs 142 and 144 are permanently deformed back to the engagement angle of FIG. 5. This was the angle at which hole 146 was tapped through tabs 142 and 144. While deforming the tabs 142, 144 back down to the initial engagement angle ensures good engagement of the threaded tabs with threads 168 as explained below, it is understood that the final engagement angle shown in FIG. 12 may be different than the initial engagement angle shown in FIG. 5.

As explained in the Background of the Invention, wooden members may constrict after assembly due to the evaporation of moisture. For example, in FIG. 13, the thickness of bottom plate 110, floor and rim joist 116 and top plates has shrunk, and plate 140 affixed thereto is pulled down along the shank of the stationary take-up screw 160. In the embodiment shown in FIG. 13, the thickness of members 110, 114 has shrunk to the point where tabs 142 and 144 engage tab engagement threads 168. As indicated above, the hole tapped between tabs 142 and 144 has a diameter and thread pitch matching the diameter and thread pitch of tab engagement threads 168. However, as tabs 142 and 144 are bent slightly upward and have a slight degree of elasticity owing to grooves 150, tabs 142 and 144 are able to flex slightly to allow take-up plate 140 to slide down along the length of tab engagement threads 168.

Figure 13:
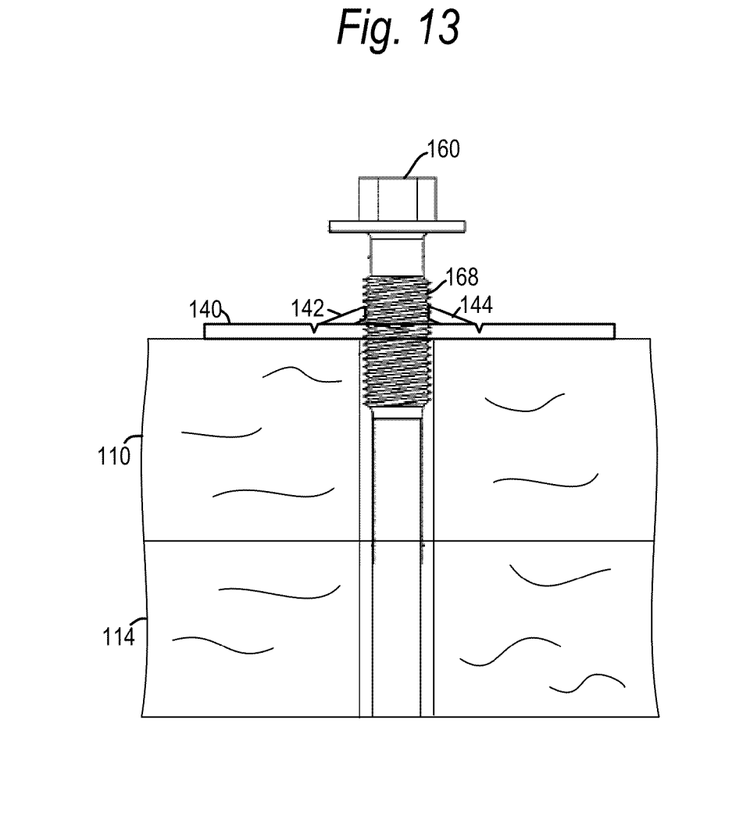
FIG. 13 shows a relative position of the take-up plate and take-up screw after wooden members of the framed construction have constricted due to evaporation of moisture within the wooden members.

However, in the event of an upward load on level 102, the fastener 100 prevents upward movement of plate 140 and members 110, 114 affixed thereto, relative to take-up screw 160. In particular, the tapped threaded edges of tabs 142 and 144 engage within the tab engagement threads 168. An upward force of take-up plate 140 relative to the take-up screw 160 results in a downward force of the engagement threads 168 against the threaded edges of tabs 142, 144, thus resisting the upward movement of the take-up plate 140, members 110 and 114, and level 102 in general. Larger upward forces only increases the force with which tabs 142 and 144 grip tab engagement threads 168.

In this manner, the take-up fastener 100 allows one-way motion of the take-up plate 140 relative to take-up screw 160. This one-way motion allows the wooden members 110 and 114 to constrict and slide down along the length of take-up screw 160 but prevents upward movement of the members 110 and 114 upon an upward force exerted on level 102. Moreover, as take-up fastener 100 is provided on the interior of level 102, fastener 100 may be inserted without the need of scaffolding or other support structures on the exterior as is otherwise necessary to install conventional coil straps. In embodiments, take-up fasteners 100 may be used to affix second and subsequent levels to the below-adjacent level.

The gauge of take-up plate 140 is selected so that tabs 142, 144 have more than one thread for engaging more than one thread from tab engagement threads 168. For example, at 24 threads per inch, tabs 142, 144 may have a thickness sufficient to be tapped with between 3 and 4 threads along the edges of tabs 142, 144 defining the hole 146. Thus, upon settling of the members 110, 114 so that tabs 142 and 144 engage tab engagement threads 168, tabs 142 and 144 may have a plurality of threads which engage with tab engagement threads 168. It is understood that different gauge steels may be used for take-up plate 140, and the number of threads which engage between tabs 142, 144 and tab engagement threads 168 may be less than 3 and more than 4 in further embodiments.

Figure 14:
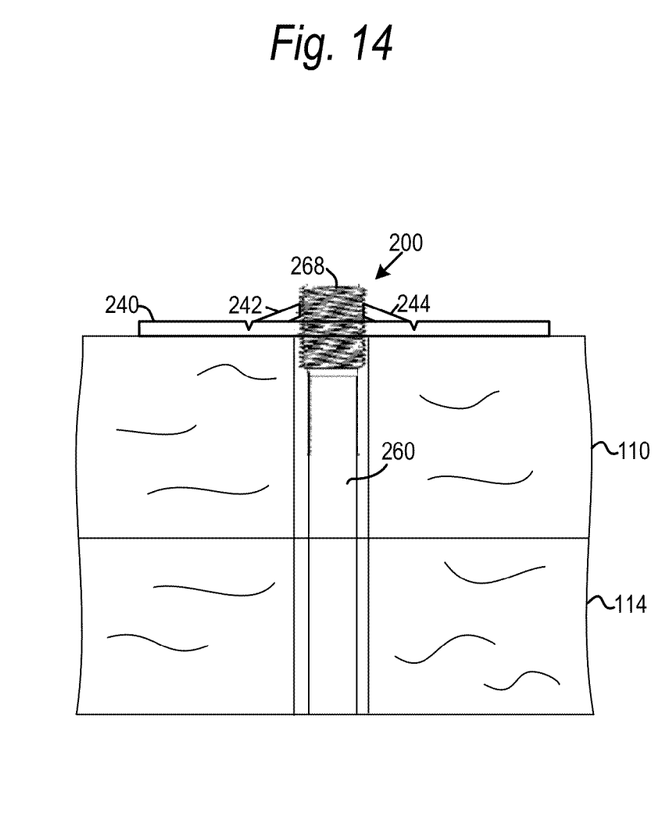
FIG. 14 is a take-up fastener according to a first alternative embodiment of the present invention.
Figure 15:
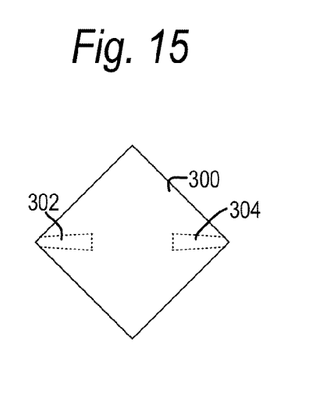
FIGS. 15-18 are views of a take-up fastener according to a second alternative embodiment of the present invention.

FIG. 14 shows a portion of a take-up fastener 200 according to an alternative embodiment of the present invention. The embodiment of FIG. 14 includes a take-up plate 240 which may be identical to take-up plate 140 described above. However, in the embodiment of FIG. 14, take-up screw 160 may be replaced with a take-up bolt 260. In this embodiment, a bore may be formed through the bottom plate 110 and subflooring 114 of level 102 as well as the top plates 120 and 122 of level 104. Thereafter, an elongate cylindrical bolt 260 having a diameter smaller than the bore hole may be inserted through the bore hole. The plate 240 may then be screwed down over the tab engagement threads 268 formed in the top of bolt 260. In the embodiment of FIG. 14, the tabs 242 and 244 may be deformed to the engagement angle, shown in FIGS. 5 and 12, of for example 33.75°.

The diameter and thread pitch on the edges of tabs 242, 244 may be the same as the diameter and thread pitch of the engagement threads 268. Thus, the plate 240 can screw down over the bolt 260 with the tabs 242 and 244 engaging with tab engagement threads 268. Once plate 240 is screwed down over take-up bolt 260, a nut may be affixed over the opposite end of bolt 260 protruding through top plates 120 and 122. In the embodiment of FIG. 14, the plate 240 may have a size and shape so that the plate 240 at its widest diameter still fits within the width of top plate 110. In this way, plate 240 may be screwed down over bolt 260 to a final position of any orientation and no portion of plate 240 will extend beyond the width of bottom plate 110.

Figure 16:
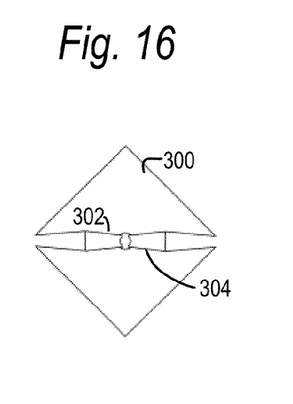
Figure 17:
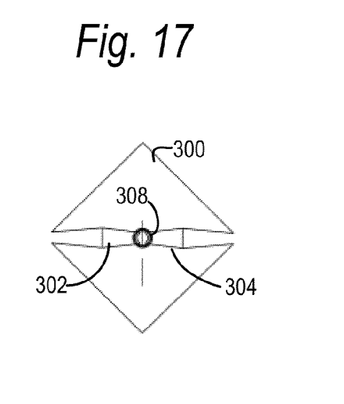

A take-up fastener according to a further embodiment is shown in FIGS. 15-19. The embodiment of FIGS. 15-19 begins with a bearing plate 300. Tab sections 302 and 304 (shown by dashed lines in FIG. 15) are partially cut and bent inward so the ends of tabs 302 and 304 meet at a center of bearing plate 300 as shown in FIG. 16. In FIG. 17, a threaded hole 308 is tapped through the ends of tabs 302 and 304 and through a center of bearing plate 300. Bearing plate 300 may be affixed to bottom plate 110 via fastening holes (not shown) as described above.

Figure 18:
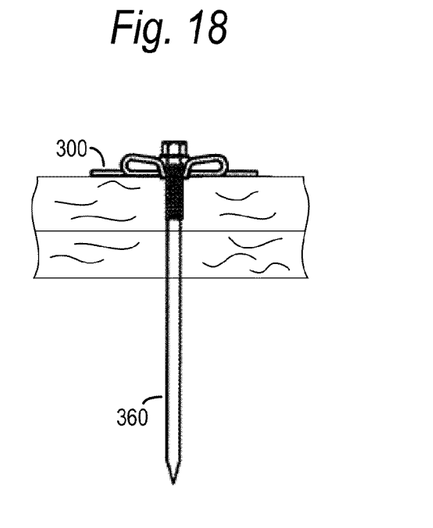
Figure 19:
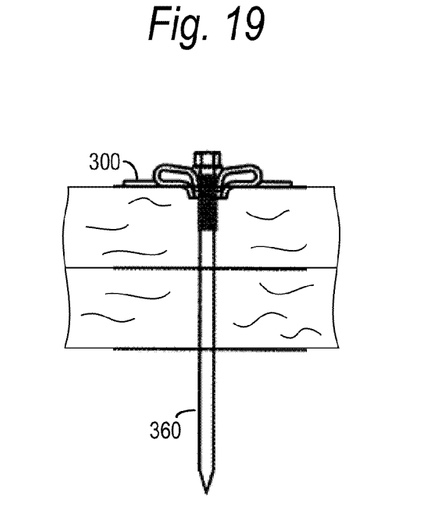
FIG. 19 is a view of a take-up fastener according to a third alternative embodiment of the present invention.

The embodiment of FIGS. 15-19 may work with a take-up screw 360 which may be identical to take-up screw 160 described above. Initially, tapped hole 308 may have a diameter larger than the diameter of the shank of take-up screw 360. However, when a flange 368 of take-up screw 360 engages the tabs 302 and 304, the tabs 302 and 304 are deformed through the central tapped hole in bearing plate 300 so as to decrease the size of the tapped hole between tabs 302 and 304. Thus, as shown in FIG. 18, this configuration allows one-way motion of the bearing plate 300 relative to the take-up screw 360. However, if upward forces attempt to move the bearing plate upward relative to the take-up screw, tabs 302 and 304 are pulled into the central bore hole and bind against tab engagement threads 368 to prevent upward movement of bottom plate 110 and subflooring 114 as described above. FIG. 19 may be identical to the embodiment of FIGS. 15-18 with the exception that bore 308 through bearing plate 300 may be larger so that both portions of tabs 302 and 304 as well as a portion of the bearing plate 300 itself are drawn down into the bore created by take-up screw 360.

Figure 20:
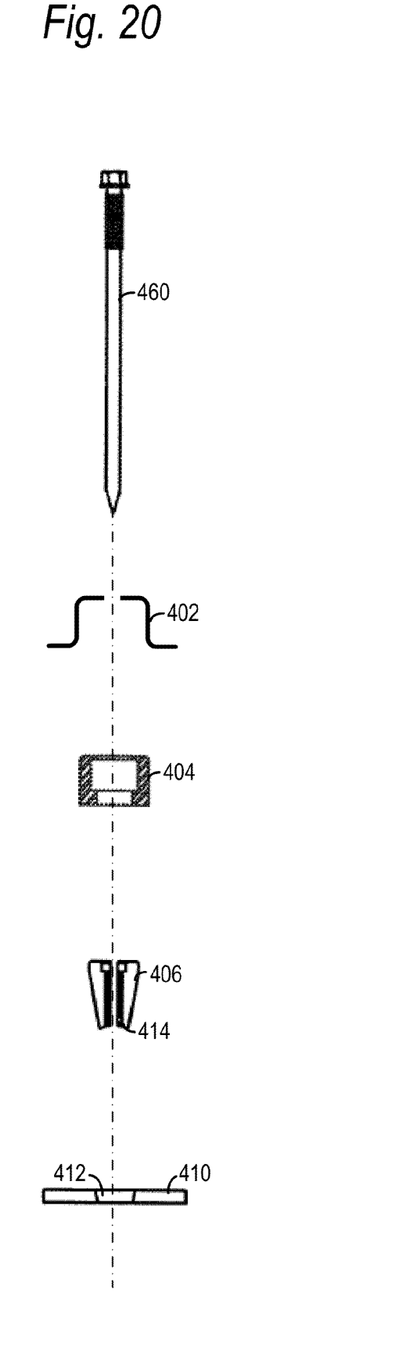
FIGS. 20 and 21 are views of a take-up fastener according to a fourth embodiment of the present invention.
Figure 21:
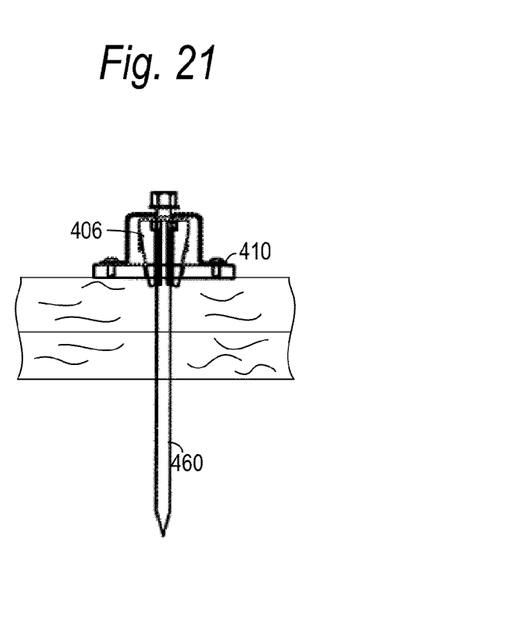

FIGS. 20 and 21 show a further embodiment of a take-up fastener 100 according to the present invention. As seen in the exploded view of FIG. 20, this embodiment may include a take-up screw 460 which may be identical to take-up screw 160 described above. This embodiment further includes a housing 402, a cap 404, and a threaded wedge 406. Threaded wedge 406 may be formed of two independent halves which define a cylindrical threaded bore when the halves are brought together. The halves may be held together by being inserted into elastic cap 404. This embodiment further includes a bearing plate 410 which affixes to bottom plate 110 in a manner similar to take-up plate 140 described above. Bearing plate 410 includes a tapered opening 412 with a diameter large enough to receive a bottom portion 414 of wedge 406.

As seen in FIG. 21, when assembled, take-up screw 460 may be inserted through enclosure 402, cap 404 and between the halves of wedge 406 down through opening 412 in bearing plate 410. When assembled, wedge 406 allows upward motion of the take-up screw 460 relative to bearing plate 410. However, upon an upward force on bearing plate 410 relative to take-up screw 460, wedge 406 is forced down further into tapered opening 412, thereby forcing the halves of wedge 406 to grip take-up screw 460 more tightly to thereby prevent upward movement of bearing plate 410 relative to take-up screw 460.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A fastener for fastening an upper level to a lower level located below the upper level, the fastener provided to resist upwards loads on the upper level, the fastener comprising:
   a plate affixed to a portion of the upper level, the plate including edges defining a hole through the plate; and
   an elongate cylindrical member positioned through the hole, the elongate cylindrical member having a proximal end and a distal end, the distal end fastened to a portion of the lower level, and the proximal end engaging the edges of the plate defining the hole, the engagement between the proximal end and the edges of the plate allowing the plate to move downward relative to the elongate cylindrical member but preventing the plate from moving upward relative to the elongate cylindrical member;
   wherein the elongate cylindrical member is a screw including a flange and threads, the tabs bent up from the plate at a first angle allowing insertion of a shank of the screw, and the tabs bent up from the plate at a second angle for engaging the threads, the flange moving the tabs from the first angle to the second angle upon insertion of the screw through the hole.

2. The fastener recited in claim 1, wherein the edges of the plate defining the hole comprise a pair of tabs extending up from the plate toward each other, the upwardly extending tabs having edges engaging the elongate cylindrical member, the upwardly extending tabs allowing relative motion of the plate downward along the elongate cylindrical member, but preventing relative motion of the plate upward along the elongate cylindrical member.

3. The fastener recited in claim 2, wherein the elongate cylindrical member includes threads, the edges of the tabs engaging the threads of the elongate cylindrical member to allow the plate to move downward relative to the elongate cylindrical member but preventing the plate from moving upward relative to the elongate cylindrical member.

4. The fastener recited in claim 3, wherein the edges of the tabs include threads for engaging the threads of the elongate cylindrical member.

5. The fastener recited in claim 1, wherein the elongate cylindrical member is a screw.

6. The fastener recited in claim 1, wherein the elongate cylindrical member is a bolt.

7. The fastener recited in claim 1, wherein the upper level is a first or higher floor, and the lower level is a foundation or higher a higher floor.

8. The fastener recited in claim 1, wherein the portion of the upper level to which the plate is affixed is a bottom plate of the upper level, and the portion of the lower level to which the distal end of the cylindrical member is affixed is a top plate of the lower level.

9. The fastener recited in claim 1, wherein the upper level is a first or higher floor, and the lower level is a foundation or a higher floor.

10. A fastener for fastening an upper level to a lower level below, the fastener provided to resist upwards loads on the upper level, the fastener comprising:
    a plate affixed to a portion of the upper level, the plate including first and second tabs, angled upward toward each other off of the plate, the first and second tabs having semicircular edges which together define a hole through the plate between the tabs; and
    an elongate cylindrical member positioned through the hole, the elongate cylindrical member having a proximal end and a distal end, the distal end fastened to a portion of the lower level, the proximal end including threads;
    wherein upon downward movement of the plate relative to the elongate cylindrical member, the edges of the tabs engage the threads of the elongate cylindrical member, the engagement between the tabs and threads allowing further downward movement of the plate relative to the elongate cylindrical member, but preventing upward movement of the plate relative to the elongate cylindrical members;
    wherein the first and second tabs bend to a first angle allowing the elongate cylindrical member including the threads to be inserted between the first and second tabs, and wherein the first and second tabs bend to a second angle capable of engaging the threads; and
    wherein the elongate cylindrical member includes a flange at the proximal end and spaced proximally from the threads, the flange moving the first and second tabs from the first angle to the second angle upon insertion of the elongate cylindrical member through the hole.

11. The fastener recited in claim 10, wherein the edges of the first and second tabs include threads for engaging the threads of the elongate cylindrical member.

* * * * *

UNITED STATES PATENT AND TRADEMARK OFFICE
CERTIFICATE OF CORRECTION

| | |
|---|---|
| PATENT NO. | : 8,656,650 B2 |
| APPLICATION NO. | : 13/632712 |
| DATED | : February 25, 2014 |
| INVENTOR(S) | : D. Gray et al. |

Page 1 of 1

It is certified that error appears in the above-identified patent and that said Letters Patent is hereby corrected as shown below:

In the Claims:

Column 10, line 5 (claim 7, line 3) please change "higher a higher" to -- a higher --

Column 10, line 32 (claim 10, line 20) please change "members;" to -- member; --

Signed and Sealed this
Twenty-sixth Day of August, 2014

Michelle K. Lee
*Deputy Director of the United States Patent and Trademark Office*